(12) United States Patent
Beavin et al.

(10) Patent No.: US 9,652,497 B2
(45) Date of Patent: May 16, 2017

(54) PROCESSING QUERIES USING HYBRID ACCESS PATHS

(71) Applicant: International Business Machines Corporation, Armonk, NY (US)

(72) Inventors: Thomas A. Beavin, Milpitas, CA (US); Andrei F. Lurie, San Jose, CA (US); Terence P. Purcell, Springfield, IL (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 14/259,831

(22) Filed: Apr. 23, 2014

(65) Prior Publication Data

US 2015/0310063 A1    Oct. 29, 2015

(51) Int. Cl.
*G06F 7/00* (2006.01)
*G06F 17/30* (2006.01)

(52) U.S. Cl.
CPC .. *G06F 17/30469* (2013.01); *G06F 17/30463* (2013.01)

(58) Field of Classification Search
None
See application file for complete search history.

(56) References Cited

U.S. PATENT DOCUMENTS

| | | |
|---|---|---|
| 6,219,660 B1 | 4/2001 | Haderle et al. |
| 6,615,206 B1 | 9/2003 | Jakobsson et al. |
| 7,085,754 B2 | 8/2006 | Sinnott, Jr. |
| 7,698,253 B2 | 4/2010 | Hrle |
| 7,814,094 B2 | 10/2010 | Au et al. |
| 7,953,726 B2 | 5/2011 | Purcell |
| 7,974,967 B2 * | 7/2011 | Scheuermann ... G06F 17/30463 707/713 |
| 8,037,274 B2 | 10/2011 | Kawasaki |
| 8,190,595 B2 | 5/2012 | Bruno et al. |
| 2002/0010911 A1 | 1/2002 | Cheng et al. |
| 2005/0160102 A1 | 7/2005 | Abdo et al. |

(Continued)

OTHER PUBLICATIONS

List of IBM Patents or Patent Applications Treated as Related, Mar. 21, 2015.

(Continued)

*Primary Examiner* — Uyen Le
(74) *Attorney, Agent, or Firm* — Anthony V. S. England; Mohammed Kasnet

(57) ABSTRACT

Embodiments of techniques related to optimizing and processing queries are disclosed. In one embodiment, a query to access data of one or more databases is received, and a hybrid access path for accessing the data is generated. Generating the hybrid access path may include determining a plurality of candidate access paths and respective path cost values and selecting, based on the respective path cost values, two or more candidate access paths from the plurality of candidate access paths. Generating the hybrid access path may include generating, based on the two or more candidate access paths, the hybrid access path, the hybrid access path including at least one decision point and a set of options. The at least one decision point of the hybrid access path may indicate a difference between two or more candidate sequences of operations of candidate access paths from the two or more candidate access paths.

20 Claims, 7 Drawing Sheets

(56) References Cited

U.S. PATENT DOCUMENTS

| | | | |
|---|---|---|---|
| 2006/0122975 A1* | 6/2006 | Taylor | G06F 17/30306 |
| 2008/0052266 A1* | 2/2008 | Goldstein | G06F 17/30474 |
| 2012/0047158 A1 | 2/2012 | Lee et al. | |
| 2012/0072455 A1* | 3/2012 | Jain | G06F 17/30427 707/779 |
| 2013/0086038 A1 | 4/2013 | Perry | |
| 2013/0138630 A1 | 5/2013 | Yang et al. | |
| 2013/0262435 A1 | 10/2013 | Bossman et al. | |

OTHER PUBLICATIONS

List of IBM Patents or Patent Applications Treated as Related, Feb. 4, 2015.
Breitling, "The Effects of OICA and OIC on Access Paths", Centrex Consulting Corporation, Hotsos Symposium Mar. 6-9, 2005, 31 pp.
IBM et al., "Adaptive Path Selection for Query With Input Variables", IPCOM000036179D, Jan. 28, 2005, 4 pp.
Chaudhuri et al., "Efficient Evaluation of Queries With Mining Predicates", IEEE/ICDE Proceedings of the 18th International Conference on Data Engineering, Feb. 26-Mar. 1, 2002, 12 pp.
List of IBM Patents or Patent Applications Treated as Related.
Thomas A. Beavin, et al. "Processing Queries Using Hybrid Access Paths," U.S. Appl. No. 14/664,839, filed Mar. 21, 2015.
Thomas A. Beavin, et al. "Technology for Join Processing," U.S. Appl. No. 14/591,596, filed Jan. 7, 2015.
Thomas A. Beavin, et al. "Technology for Join Processing," U.S. Appl. No. 14/965,737, filed Dec. 31, 2015.
Ronald Barber et al., Business Analytics in (a) Blink, Lecture Notes in Business Information Processing, v 126 LNBIP, p. 1-22, 2012, Enabling Real-Time Business Intelligence—5th International Workshop, BIRTE 2011, Springer Verlag.

* cited by examiner

PROCESSING QUERIES USING HYBRID ACCESS PATHS

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems, cloud service providers, and other enterprise software systems.

End user reporting and analysis products (typically referred to as Business Intelligence, or BI, tools) may allow users to author reports and perform data exploration and analysis on a myriad of data sources including, primarily, relational and multi-dimensional databases, as well as flat files, Extensible Markup Language ("XML") data, data streams, and unorganized text and data. BI tools may generate and/or process queries to obtain relevant information from the underlying data sources.

SUMMARY

In one embodiment, a method includes receiving a query to access data of one or more databases and generating, based on the query, a hybrid access path for accessing the data. Generating the hybrid access path may include determining a plurality of candidate access paths and respective path cost values, with each of the plurality of candidate access paths comprising a respective candidate sequence of operations. Generating the hybrid access path may also include selecting, based on the respective path cost values, two or more candidate access paths from the plurality of candidate access paths and generating, based on the two or more candidate access paths, the hybrid access path, with the hybrid access path including at least one decision point and a set of options. The at least one decision point of the hybrid access path may indicate a respective difference between the respective candidate sequence of operations of a first candidate access path from the two or more candidate access paths and the respective candidate sequence of operations of a second candidate access path from the two or more candidate access paths.

In another embodiment, a system includes at least one processor, and a computer-readable medium having instructions embodied therewith, the instructions executable by the at least one processor to cause the at least one processor to: receive a query to access data of one or more databases and generate, based on the query, a hybrid access path for accessing the data. Generating the hybrid access path may include determining a plurality of candidate access paths and respective path cost values, with each of the plurality of candidate access paths comprising a respective candidate sequence of operations. Generating the hybrid access path may also include selecting, based on the respective path cost values, two or more candidate access paths from the plurality of candidate access paths and generating, based on the two or more candidate access paths, the hybrid access path, with the hybrid access path including at least one decision point and a respective set of options. The at least one decision point of the hybrid access path may indicate a respective difference between the respective candidate sequence of operations of a first candidate access path from the two or more candidate access paths and the respective candidate sequence of operations of a second candidate access path from the two or more candidate access paths.

In another embodiment, a computer program product for processing a query using a hybrid access path includes a computer readable storage medium having program instructions embodied therewith, the program instructions executable by at least one processor to cause the at least one processor to: receive a query to access data of one or more databases and generate, based on the query, a hybrid access path for accessing the data. Generating the hybrid access path may include determining a plurality of candidate access paths and respective path cost values, with each of the plurality of candidate access paths comprising a respective candidate sequence of operations. Generating the hybrid access path may also include selecting, based on the respective path cost values, two or more candidate access paths from the plurality of candidate access paths and generating, based on the two or more candidate access paths, the hybrid access path, with the hybrid access path including at least one decision point and a set of options. The at least one decision point of the hybrid access path may indicate a respective difference between the respective candidate sequence of operations of a first candidate access path from the two or more candidate access paths and the respective candidate sequence of operations of a second candidate access path from the two or more candidate access paths.

The details of one or more examples are set forth in the accompanying drawings and the description below. Other features will be apparent from the description and drawings, and from the claims.

DETAILED DESCRIPTION

Techniques of the present disclosure may enable database management systems or other computing systems to process queries by generating and/or executing hybrid access paths that leave certain parameters undecided until execution time. By utilizing hybrid access paths as described herein, such systems may more efficiently access data, such as data stored in a relational database, and may potentially avoid selecting an access path based on assumptions or estimations that may not hold true at execution time. That is, the techniques described herein may provide a method to address potentially risky access path selections in a relational database system. Such techniques may provide particular benefit when compared to cost-based query optimization or any other optimization situations where a choice has to be made regarding the sequence of operations to be performed to execute a query, without the availability of sufficient information.

When a query is being optimized at bind (or prepare) time, an optimizer (e.g., a cost-based query optimizer) may use statistics to determine the most optimal access path. However, in many cases, the optimizer may not have sufficient information to be able to make a good decision as to which access path is more optimal. For instance, a query such as
SELECT . . . WHERE BIRTHDATE >?
may include a parameter marker (e.g., BIRTHDATE) in the predicate that can qualify anywhere from 0% to 100% of the data elements of a data source, depending on the value of the host variable at execution time. If a query optimizer makes an important decision based on such a predicate filter factor, the resulting access path may drastically lower performance. That is, the resulting access path may be "risky" in that execution of the access path may result in inefficient acquisition of the relevant data if the predicate filter factor estimated at optimization time is not the same as at execution time. Techniques of the present disclosure may enable more efficient query optimization that results in a hybrid access path that avoids selecting an access path based on estimation or guess work by leaving certain decisions undecided until execution time. Furthermore, by generating a single hybrid access path, techniques of the present disclosure may improve query optimization by reducing computational cost at build time and/or execution time and avoiding excessive access plan multiplicity.

Figure 1:
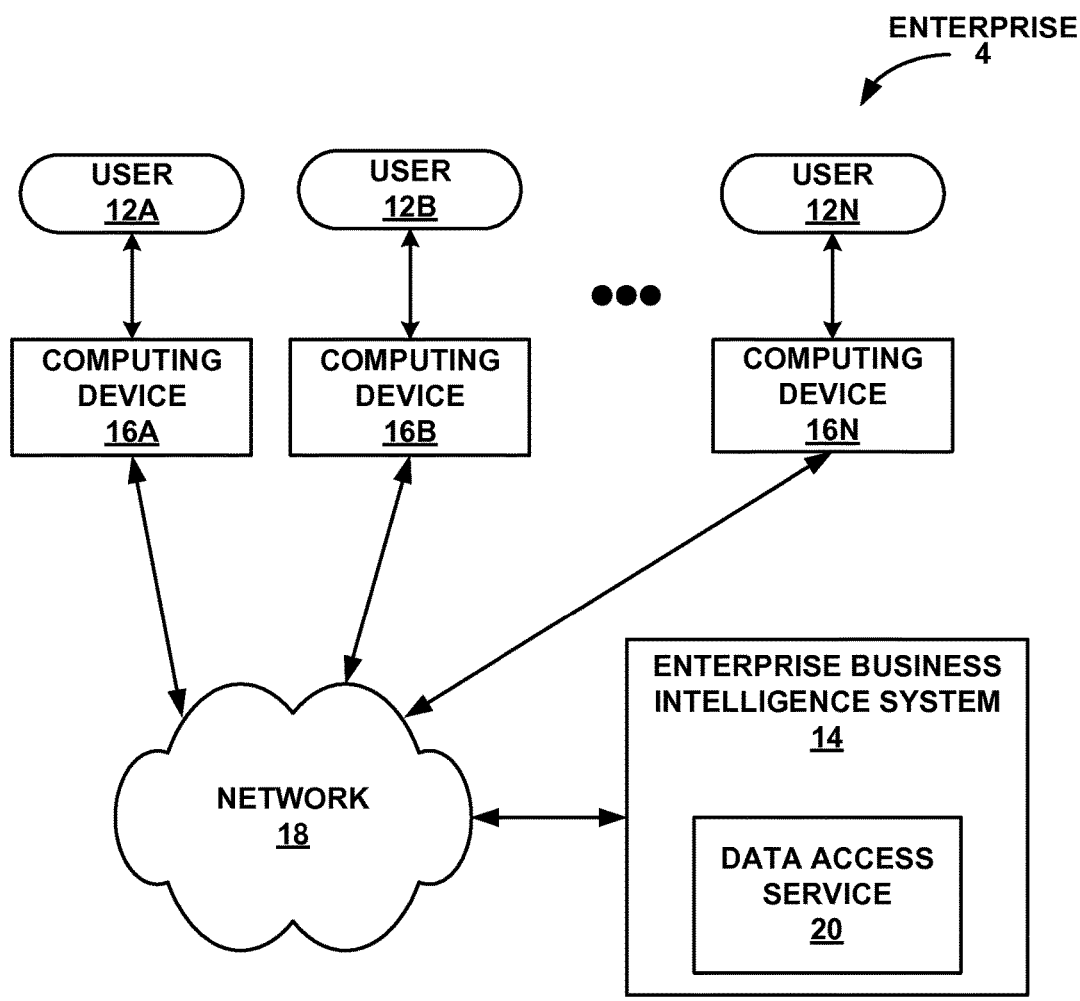
FIG. 1 is a block diagram illustrating an example computing environment in which a plurality of users interact with an enterprise business intelligence system, in accordance with one or more techniques of the present disclosure.

FIG. 1 is a block diagram illustrating an example enterprise 4 having a computing environment in which a plurality of users 12A-12N (collectively, "users 12") interact with an enterprise business intelligence system 14, in accordance with one or more techniques of the present disclosure. In the example of FIG. 1, enterprise business intelligence system 14 is communicatively coupled to a number of computing devices 16A-16N (collectively, "computing devices 16") by an enterprise network 18. Users 12 interact with respective ones of computing devices 16 to access enterprise business intelligence system 14.

The techniques of the present disclosure are described herein with reference to an enterprise business intelligence system, such as an enterprise financial or budget planning system. However, the techniques described may be readily applied to other software systems, including other large-scale enterprise software systems. Examples of enterprise software systems include order management systems, inventory management systems, sales force management systems, business intelligence tools, cloud service management systems, enterprise reporting tools, project and resource management systems, and other enterprise software systems.

Many enterprise performance management and business planning applications require a large base of users to enter data that the software then accumulates into higher level areas of responsibility in the organization. Moreover, once data has been entered, it must be retrieved to be utilized. The system may perform mathematical calculations on the data, combining data submitted by one user with data submitted by other users. Using the results of these calculations, the system may generate reports for review by higher management. Often these complex systems make use of multidimensional data sources that organize and manipulate the tremendous volume of data using data structures referred to as data cubes. Each data cube, for example, includes a plurality of hierarchical dimensions having levels and members for storing the multidimensional data.

In the example of FIG. 1, users 12 may view and manipulate multidimensional data via their respective computing devices 16. The data may be "multidimensional" in that each multidimensional data element is defined by a plurality of different object types, where each object is associated with a different dimension. Users 12 may, for example, retrieve data related to store sales by entering a name of a sales person, a store identifier, a date, a product, and a price at which the product was sold, into one of computing devices 16.

Enterprise users 12 may use a variety of different types of computing devices 16 to utilize a business intelligence UI and interact with enterprise business intelligence system 14 via enterprise network 18. For example, an enterprise user 12 may utilize a business intelligence UI and interact with enterprise business intelligence system 14 using a laptop computer, desktop computer, or the like, which implements a web browser. Alternatively, an enterprise user 12 may use a smartphone, personal digital assistant (PDA), or similar device, utilizing a business intelligence UI in either a web browser or a dedicated mobile application for interacting with enterprise business intelligence system 14. Further examples of computing devices 16 may include workstation computers, netbooks, tablet computers, E-readers, or any other computing device. In any case, a business intelligence UI running on a user's computing device 16 may access various data sources from within enterprise business intelligence system 14, as well as any of a variety of external network resources and any of a variety of external data sources.

Enterprise network 18, in the example of FIG. 1, may represent any communication network, such as a packet-based digital network like a private enterprise intranet or a public network like the Internet. In this manner, the computing environment of enterprise 4 can readily scale to suit large enterprises. Enterprise users 12 may directly access enterprise business intelligence system 14 via a local area network, or may remotely access enterprise business intelligence system 14 via a virtual private network, remote dial-up, or similar remote access communication mechanism.

In some examples, a business intelligence UI running on computing devices 16 may include functionality to create and/or generate one or more business intelligence reports. Reports may include any visual representation or depiction of data such as tables, charts, graphs, or other methods of disseminating information. For example, reports may include a graph with sales values assigned to a vertical axis, and time values assigned to a horizontal axis, a chart of revenue values recorded for various sales regions, a table of payroll data values recorded for different enterprise locations, a graph of enterprise spending by department, and the like. Users 12 may interact with computing devices 16 to generate reports by selecting different data elements and/or dimensions to display in visualizations for reports.

In the example of FIG. 1, enterprise software applications may generate queries to obtain data elements (e.g., for inclusion in reports). For instance, an enterprise software application may receive input (e.g., at computing device 16A) from a report author (e.g., user 12A) indicating one or more data elements (e.g., within enterprise business intelligence system 14 and/or at another location) that are to be included in a report. The enterprise software application may generate one or more queries to obtain the indicated data elements, and provide the query to one or more components of enterprise business intelligence system 14 (e.g., via network 18).

Enterprise business intelligence system 14, in the example of FIG. 1, includes data access service 20. Data access service 20 may be operable to receive, optimize, and/or execute queries and thereby provide the underlying data elements. That is, data access service 20 may serve as a logical interface to various data sources by receiving and processing queries adhering to a structured query language, such as a multidimensional query language (e.g., MDX) or a relational database query language (e.g., SQL), in order to obtain requested data elements.

In the example of FIG. 1, data access service 20 may utilize one or more techniques of the present disclosure to optimize a received query and thereby determine a hybrid access path. For instance, data access service 20 may parse the query and determine a plurality of candidate access paths. Each candidate access path may include a sequence of operations (e.g., sort operations, join operations, indications of an access method for accessing a particular data source, such as an index to use, or other operations) that may be executed to obtain the requested data elements. Data access service 20 may determine respective path cost values for each of the candidate access paths. Data access service 20 may determine the path cost value for a candidate access path based on prior experience (e.g., statistics about previous execution time of various operations) and/or estimates regarding the operations in the candidate access path. That is, a path cost value for a candidate access path may be based at least in part on heuristics about the included operations. The path cost value may represent the computational difficulty that is likely to be incurred in executing the access path. In various examples, the path cost value may represent execution duration, processor consumption, processor instruction cycles, some combination thereof, or other measures.

In some examples, based on the respective path cost values, data access service 20 may select two or more candidate access paths from the plurality of candidate access paths. As one example, data access service 20 may select a number (e.g., 2, 3, 5, or other number) of candidate access paths having the lowest or "best" cost value. That is, data access service 20 may select the candidate access paths that are predicted to most efficiently execute the query. In some examples, data access service 20 may select all candidate access paths meeting a specified criterion, such as all candidate access paths having a path cost value below a threshold value.

Data access service 20 may, in the example of FIG. 1, generate a hybrid access path by condensing the selected candidate access paths to a single access path. For instance, data access service 20 may traverse each of the selected candidate access paths to determine which operations are the same among all selected candidate access paths, and which operations are different. If an operation is the same in the candidate access paths, data access service 20 may copy the operation to the hybrid access path. If a next operation is different among the candidate access paths, data access service 20 may create a placeholder or "decision point," and create a set of options for the decision point. The set of options may represent the differing operations of the selected candidate access paths. When the hybrid access path is executed, the decision point may act as an indicator that a choice must be made from the set of options associated with the decision point. In other words, data access service 20 may be operable to create a hybrid access path that contains one or more decision points that may remain unbound until execution time. Upon execution, the decision point can be resolved by selecting one of the options from the associated set of options (e.g., based on up-to-date heuristics or other information that may not have been available at optimization time). In this way, data access service may reduce or eliminate the likelihood that an access path could result in inefficient acquisition of the requested data elements.

In some examples, data access service 20 may be operable to output the hybrid access path for use in executing the query. For instance, data access service 20 may output the hybrid access path to one or more other components of enterprise business intelligence system 14 and/or to one or more other computing devices. In some examples, data access service 20 may additionally or alternatively be configured to execute the query by parsing the hybrid access path to obtain requested data elements. That is, data access service 20 may be operable to perform operations specified by a hybrid access path created in accordance with the techniques described herein. For instance, when executing a query having an associated hybrid access path, data access service 20 may sequentially perform operations in a manner similar to execution of a traditional access path (e.g., an access path that includes only bound operations). Responsive to encountering a decision point within the hybrid access path, data access service 20 may be operable to process the decision point, at execution time, by selecting one of a plurality of specified options for the decision point. For instance, data access service 20 may utilize one or more heuristics (e.g., historical statistics or defined estimates) to determine which option of a decision point would be more efficient.

By performing operations in accordance with the hybrid access path, data access service 20 may obtain the data elements requested by the corresponding query. In the example of FIG. 1, for instance, data access service 20 or other components of enterprise business intelligence system 14 may obtain data elements requested by the query and provide the data elements to the enterprise software application that generated the query (e.g., executing at computing device 16A). The enterprise software application may then use the data elements, such as in generating a report.

By leaving some decisions to be made at execution time, generation of hybrid access paths may reduce the possibility that an access path will drastically change efficiency based on values that are unknown at bind time. That is, using hybrid access paths may allow a database management system or other query processing system to postpone some decision making until execution time, thereby increasing the likelihood that the most efficient access path is executed. By including decision points in a single hybrid access path, generating and executing hybrid access paths to obtain data elements may avoid substantial increases in access plan size and/or access path execution cost. That is, by avoiding generation of multiple access paths, or access paths that are re-optimized at execution time, the techniques described herein may reduce or eliminate reliance on estimation or guesswork in access path determination, while largely maintaining execution efficiency and storage costs.

Figure 2:
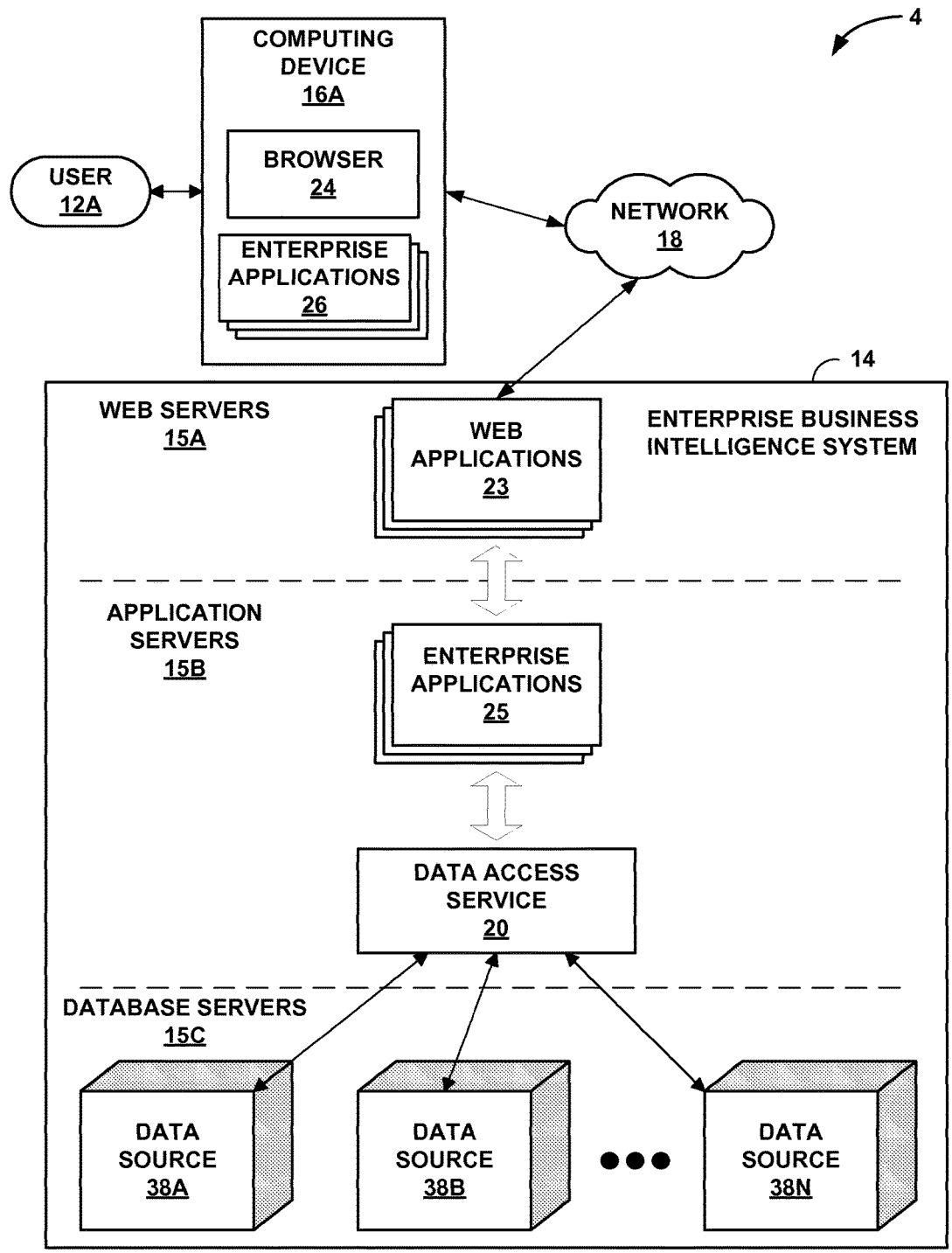
FIG. 2 is a block diagram illustrating one example of the enterprise business intelligence system shown in FIG. 1, in accordance with one or more techniques of the present disclosure.

FIG. 2 is a block diagram illustrating one example of enterprise business intelligence system 14, in accordance with one or more techniques of the present disclosure. In the example of FIG. 2, a single client computing device 16A is shown for purposes of example. Computing device 16A includes web browser 24 and one or more client-side enterprise software applications 26 that may be operable to utilize and manipulate multidimensional data (e.g., to create reports).

In the example of FIG. 2, enterprise business intelligence system 14 is implemented in accordance with a three-tier architecture. In a first tier, enterprise business intelligence system 14 includes one or more web servers 15A that may provide an operating environment for web applications 23. Web applications 23 may provide user interface functions at computing device 16A and/or to user 12A. In a second tier, enterprise business intelligence system 14 includes one or more application servers 15B. Application servers 15B may provide an operating environment for enterprise software applications 25. Enterprise software applications 25 may, in some examples, represent a business logic tier for the software system. For instance, enterprise applications 25 may provide business analytics resources and other tools for access by user 12A by using enterprise applications 26 at computing device 16A. In a third tier, enterprise business intelligence system 14 includes one or more database servers 15C. Database servers 15C may provide data sources 38A-38N (collectively, "data sources 38"). Some of data sources 38 may be implemented using a variety of vendor platforms, and may be distributed throughout enterprise 4 and/or in other locations.

In some examples, data sources 38 represent individual data bases, data cubes, tables, or any other collection of data. Data sources 38 may, in some examples, be multidimensional data sources that store information organized in multiple dimensions. In some examples, data within data sources 38 may be represented by a "data cube," a data organization structure capable of storing data logically in multiple dimensions, potentially in excess of three dimensions. In some examples, one or more of data sources may be databases configured for Online Analytical Processing ("OLAP"). In some examples, data sources may be vendor-supplied multidimensional databases, such as databases having MDX processing engines configured to receive and execute MDX queries.

As shown in FIG. 2, data access service 20 provides an interface between enterprise applications 25 and data sources 38. Data access service 20 may expose a set of functions to server-side enterprise applications 25 and/or client-side enterprise applications 26 for each of data sources 38 thereby allowing enterprise applications 25 and/or enterprise applications 26 to access data sources 38.

That is, data access service 20 may be operable to receive queries from enterprise applications 25, 26 that request data elements from one or more of data sources 38. User 12A, for example, may interact with enterprise applications 25, 26 to author a report and define a query to obtain data for the report. Consequently, enterprise applications 25, 26 may generate one or more queries (e.g., SQL queries, MDX queries, or other queries).

Data access service 20 may receive the queries and, for each query, data access service 20 may perform query optimization to determine a plan for executing the query. That is, data access service 20 may predict the most efficient sequence of operations (e.g., an access path) usable to obtain the specific data elements requested by the query. Data access service 20 may predict the most efficient sequence by enumerating possible sequences of operations (e.g., candidate access paths) and evaluating each possible sequence for efficiency. In some examples, data access service 20 may enumerate all possible candidate access paths for a query. In other examples, data access service 20 may enumerate up to a specific number of candidate access paths or may enumerate candidate access paths based on efficiency of available operations. That is, in some examples data access service 20 may refrain from enumerating candidate access paths that are inefficient.

As part of or subsequent to enumerating candidate access paths for a query, data access service 20 may determine corresponding cost values (e.g., efficiency) for the candidate access paths. In order to predict the efficiency of an access path and its included operations, data access service 20 may use various sources of information, such as the current size of a data source, access methods for accessing a data source (e.g., including available indexes), the possible value of a variable used in a predicate of the query, different types of joins that may be performed to obtain data, statistical or estimated information indicating efficiency of an operation, or any other information. In other words, data access service 20 may determine efficiency of a candidate access path using various heuristics to estimate the efficiency of the included operations. For instance, if a data source (e.g., a table) is very large (e.g., containing a large number of tuples, a large number of rows, or a large number of entries), data access service 20 may determine that it would be costly to scan the table without the use of an index. As another example, data access service 20 may determine that it would be more costly to scan a data source using a first access method (e.g., an index scan using a first index) for the data source while determining that it would be less costly to scan the data source using a second access method (e.g., an index scan using a second index, a merge scan join, etc.) for the data source. Various methods of cost estimation may be used in accordance with the techniques described herein, such as defined cost values, historical cost values, or other estimation methods.

After enumerating a plurality of candidate access paths for a received query, data access service 20 may select two or more candidate access paths to use in generating a hybrid access path for the query. That is, the hybrid access path may be a combination of two or more candidate access paths. Data access service 20 may select candidate access paths based on associated cost values, similarities between the access paths, and other factors. In some examples, data access service 20 may select candidate access paths for which the associated cost values are each below a threshold cost value. For instance, data access service 20 may select candidate access paths having a cost value below a threshold number of execution cycles or below a threshold duration of execution time. In some examples, data access service 20 may select candidate access paths for which the associated cost values are each within a specific range of the best (e.g., lowest) cost value. For instance, data access service 20 may select candidate access paths having a cost value that is smaller than 120% of the best cost value. In some examples, data access service 20 may first select the candidate access path having the best (e.g., lowest) associated cost value and then select other candidate access paths such that the respective candidate sequence of operations of the other candidate access paths and the respective candidate sequence of operations of the best candidate access path include less than a threshold number of different operations. That is, in some examples, data access service 20 may select candidate access paths that are similar to the candidate access path that is associated with the best estimated cost value.

After selecting a plurality of candidate access paths, data access service 20 may traverse the sequence of operations for each of the selected candidate access paths to determine differences between the access paths. For instance, each candidate access path may be represented by a tree structure, wherein the initial node represents the entire access path, and child nodes represent operations to be performed. In such a representation, data access service 20 may maintain an order of the operations by traversing the tree structures in the same fashion. As data access service 20 traverses the tree structures, the root node may always be the same for each candidate access path (e.g., a node representing the query itself). Child nodes may be the same among each of the selected candidate access paths, or may be different between two or more of the selected candidate access paths. If a node is the same among all of the selected candidate access paths, data access service 20 may copy the node to the hybrid access path. That is, data access service 20 may create a bound operation in the hybrid access path similar to bound operations in traditional access paths (e.g., those relying on cost estimates only). If, however, a node is different among two or more of the selected candidate access paths, data access service 20 may create a placeholder node in the hybrid access path.

A placeholder node, or "decision point," may represent a variation or difference between the respective candidate sequences of operations for two or more candidate access path. That is, a decision point may indicate (e.g., to a module configured to execute the query using a hybrid access path) that a decision is to be made, at execution time, regarding which of the selected candidate access paths is to be used. Data access service 20 may create, as part of the hybrid access path, two or more child nodes for the decision point, such that the child nodes represent the different operations of the different selected candidate access paths. For instance, if only two selected candidate access paths have different operations at a point in the respective sequences of operations, the corresponding decision point may have two child nodes. If three or more of the selected candidate access paths have different operations, the corresponding decision point may have three or more child nodes.

Data access service 20 may continue to traverse the selected candidate access paths, inserting bound operations where the operations are the same and inserting decision points, with child nodes, where one or more of the candidate access paths differ. By only inserting a few extra nodes when a difference is encountered, data access service 20 may create a hybrid access path that is only marginally larger than a traditional access path.

The hybrid access path may be complete once data access service 20 has traversed all of the selected candidate access paths. Upon completion, data access service 20 may, in some examples, output an indication of the hybrid access path. For instance, data access service 20 may output a graphical indication of the hybrid access path to enterprise applications 25, 26 (e.g., for review by user 12A of computing device 16A). As another example, data access service 20 may output data defining the hybrid access path to one or more other components of enterprise business intelligence system 14 and/or one or more other computing devices for execution. That is, in some examples, data access service 20 may optimize the query for execution by other components or devices.

In some examples, data access service 20 may store the hybrid access path, such as for later execution. In the example of FIG. 2, for instance, data access service 20 may be operable to both optimize the query by generating a hybrid access path, as well as execute the query by executing the operations as laid out by the hybrid access path. Data access service 20 may execute the query responsive to completion of the hybrid access path or in response to some other indication, such as a request from enterprise applications 25, 26. In any case, data access service 20 may execute the query using the hybrid access path.

As part of execution of the query, data access service 20 may traverse the hybrid access path and perform the specified operations. If data access service 20 encounters a node of the hybrid access path that corresponds to a particular operation, data access service 20 may perform the particular operation. Such operations may include accessing one or more of data sources 38 (e.g., using an index) to obtain data elements, joining tables or other collections of data, sorting tables or data sources 38, or other operations. If data access service 20 encounters a decision point, data access service 20 may access the set of options that corresponds to the decision point (e.g., the child nodes) and determine which of the options would be more efficient based on up-to-date factors such as specified variables, available indexes or data sources, or other factors. Options may include possible access methods, including possible indexes to use for accessing a data source or table, ways to sort obtained data, different data sources, or other operations or operation options.

In some examples, data access service 20 may determine which option of the decision point to choose by reviewing recent execution costs of each option. That is, data access service 20 may use statistics or heuristics to analyze efficiency of the possible operations at execution time. In some examples, data access service 20 may determine which option to choose based on other information, such as efficiency or cost estimates, or other information.

In any case, once data access service 20 determines which option to select for a decision point, data access service 20 may perform the operation that is specified by the option. Thereafter, data access service 20 may continue to traverse the tree structure from the selected option. By evaluating decision points of a hybrid access path at execution time, data access service 20 may reduce or eliminate the likelihood that the access path will result in inefficient execution of the query. That is, because data access service 20 is able to make decisions at execution time based on up-to-date information, data access service 20 can avoid making those decisions at optimization time using inaccurate information and/or information that may be different at execution time.

In the example of FIG. 2, after executing the query in accordance with the hybrid access path, data access service 20 may output the retrieved data elements (e.g., for use by enterprise applications 25, 26). That is, data access service 20 may provide the data elements obtained by the query to one or more other components of enterprise 4. For instance, the retrieved data elements may be output to enterprise applications 26 for generating one or more reports specified by user 12A of computing device 16A.

Figure 3:
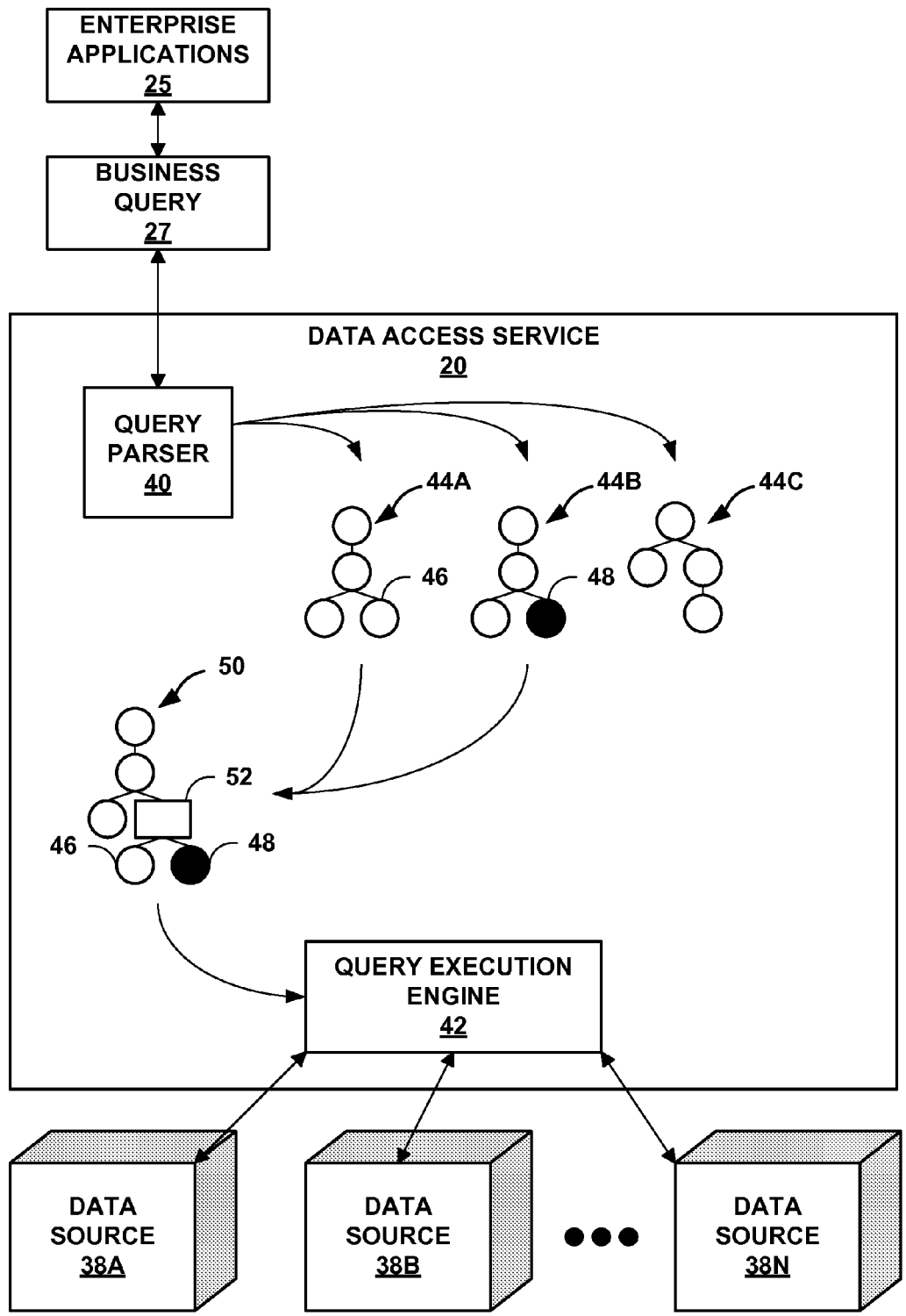
FIG. 3 is a block diagram illustrating one example of a data access service configured to process queries using hybrid access paths, in accordance with one or more techniques of the present disclosure.

FIG. 3 is a block diagram illustrating one example of data access service 20 that is configured to process queries using hybrid access paths, in accordance with one or more techniques of the present disclosure. In the example of FIG. 3, data access service 20 comprises query parser 40 and query execution engine 42. Query parser 40 may be operable to receive a query and generate a hybrid access path. Query execution engine 42 may be operable to perform operations of a hybrid access path to obtain data elements from any number of external data sources 38A-38N (data sources 38).

In some examples, query parser 40 and/or query execution engine 42 may be specialized for using one or more types of querying tools on a particular type of data source, such as MDX queries of a multidimensional data cube, SQL queries on a relational database, or other querying tools for other types of data sources. That is, hybrid access paths may be generated and/or executed to perform queries using any of a variety of query types and data sources, including MDX queries of cubes and SQL queries of relational databases. In some examples, query parser 40 and/or query execution engine 42 may be enabled to work with multiple query types and multiple types of data sources. As shown in the example of FIG. 3, data access server 20 may provide a generic interface between user 12A (e.g., computing device 16A) and data sources 38. Data access server 20 may run on a server level, an application level, or as its own intermediate level within enterprise business intelligence system 14.

In some examples, data access service 20 may include additional or alternative components not shown in the example of FIG. 3 or may include fewer components than shown in the example of FIG. 3. For instance, in some examples, query execution engine 42 may be separate and apart from query parser 40. That is, in some examples data access service 20 may be configured to generate hybrid access paths and output the hybrid access paths to one or more other components of enterprise business intelligence system 14 or one or more other computing devices for execution.

In the example of FIG. 3, query parser 40 may represent a parsing application within enterprise business intelligence system 14. In accordance with the techniques described herein, query parser 40 may parse a received business query to generate a hybrid access path. The hybrid access path may include at least one decision point and an associated set of options that enable more efficient execution of the business query.

Query parser 40 may, in the example of FIG. 3, receive business query 27 from one of enterprise applications 25. Business query 27 may represent a simple query to access a table of a data source, such as data source 38A. The query may include one or more predicates that specify the data elements requested. At least one of the predicates may include a variable, such as a variable that represents a user-provided percentage (e.g., having a range from 0 to 100). In the example of FIG. 3, the value of the variable may be unknown at optimization time. That is, query parser 40 may not know what the value of the variable is.

In the example of FIG. 3, query parser 40 may parse business query 27 to generate two or more candidate access paths. For instance, query parser 40 may determine that the data elements specified by business query 27 may be obtained by executing the sequence of operations specified in each of candidate access paths 44A, 44B, and 44C (collectively, "candidate access paths 44"). Candidate access path 44A may correspond to using a first index (e.g., specified by node 46) to access the table of data source 38A. Candidate access path 44B may correspond to using a second index (e.g., specified by node 48) to access the table. Candidate access path 44C may correspond to accessing the table directly, without using an index.

Query parser 40 may also determine the efficiency (e.g., a path cost value) for each of candidate access paths 44. In some examples, query parser 40 may determine the path cost value based on the operational cost value of each operation in the candidate access path. For instance, query parser 40 may determine the operational cost values for a candidate access path and sum the operational cost values to determine the path cost values. If an unknown variable exists in a query, query parser 40 may, in some examples, estimate a placeholder value for purposes of determining efficiency. The estimate may be based on the possible range of values, on previously provided values, or on other factors. In the example of FIG. 3, for instance, query parser 40 may provide a placeholder value of 25 based on the range of the variable (e.g., 0-100) and previously provided values.

In some examples, query parser 40 may use various heuristics or estimates to determine the cost value for each operation. For instance, query parser 40 may determine an estimated cost for a specified operation based on previous actual costs for the operation or for similar operations. That is, query parser 40 may base estimates on historical data. In some examples, query parser 40 may determine estimated cost for an operation based on pre-determined values and/or properties about the operation. For instance, query parser 40 may estimate the efficiency of a sort operation based on how many rows are in the table to be sorted, or the efficiency of a scan operation based on what data is to be obtained and what index is used. Various other methods of estimating or predicting path cost values or efficiency may be used.

In the example of FIG. 3, query parser 40 may determine a lowest relative cost value for candidate access path 44A, a slightly higher relative cost value for candidate access path 44B with respect to candidate access path 44A, and a substantially higher relative cost value for candidate access path 44C with respect to candidate access paths 44A and 44B. That is, because candidate access path 44C does not use an index to access the table of data source 38B, query parser 40 may determine that it is likely an inefficient sequence of operations that is usable to obtain the requested data elements. Conversely, query parser 40 may determine that candidate access paths 44A and 44B are each a more efficient sequence of operations that is usable to obtain the requested data. Query parser 40 may determine that candidate access path 44A is likely more efficient than candidate access path 44B based on the placeholder value of 25 for the variable of business query 27. That is, when the value of the variable is 25, it may be more efficient to use the first index to access the table of data source 38A than to use the second index to access the table.

While candidate access path 44A may be, in some examples, more efficient when the value of the variable is 25, candidate access path 44A may be substantially less efficient (e.g., than candidate access path 44B) when the value of the variable is different. For instance, if the value of the variable is 75, candidate access path 44B may be the most efficient candidate access path. Thus, simply selecting candidate access path 44A for execution of business query 27 may be risky because the placeholder value for the variable that is used at optimization time may be incorrect at execution time.

Instead of selecting the candidate access path that is currently the most efficient (e.g., candidate access path 44A), query parser 40 may select two or more candidate access paths for combination to create a hybrid access path (e.g., hybrid access path 50). In the example of FIG. 3, for instance, query parser 40 may select the candidate access path having the lowest (e.g., best) cost value and those candidate access paths having a cost value within a threshold of the lowest cost value. That is, query parser 40 may select candidate access paths 44A and 44B.

Query parser 40 may traverse each of the selected candidate access paths, starting with the respective root node. When query parser 40 encounters nodes that are the same among the selected candidate access paths, query parser 40 may copy the node to the hybrid access path. When query parser 40 encounters nodes that are different among at least two of the selected candidate access paths, query parser 40 may insert a decision point into the hybrid access path, and copy the different nodes to the hybrid access path as child nodes of the decision point. In the example of FIG. 3, for instance, query parser 40 may encounter node 46 of candidate access path 44A and node 48 of candidate access path 44B when parsing the candidate access paths. Query parser 40 may create decision point 52 in hybrid access path 50 and add nodes 46 and 48 to hybrid access path 50 as child nodes of decision point 52. Nodes 46 and 48 may represent the set of options that corresponds to decision point 50.

In the example of FIG. 3, after creating hybrid access path 50, query parser 40 may output an indication of hybrid access path 50. For instance, query parser 40 may output data indicating the sequence of operations to query execution engine 42. In some examples, query execution engine 42 may receive data from query parser 40 or enterprise applications 25 indicating a specified value, such as 80, for the variable included in business query 27. That is, query execution engine 42 may receive data about business query 27, from enterprise applications 25 and/or other sources. The data may provide information that was not available at optimization time.

Query execution engine 42 may execute business query 27 using hybrid access path 50. Query execution engine 42 may traverse hybrid access path 50 and perform operations specified by the branch nodes, using the item or structure specified by corresponding child nodes. When query execution engine 42 encounters a decision point, such as decision point 52, query execution engine 42 may evaluate the corresponding set of options (e.g., child nodes) to determine which is currently most efficient. In the example of FIG. 3, for instance, query execution engine 42 may determine whether it is more efficient to select node 46 and use the first index to access the table of data source 38A or select node 48 and use the second index to access the table. Because query execution engine 42 received the value of 80 for the variable, query execution engine 42 may determine which index is more efficient based on the value. That is, query execution engine 42 may determine what option to use for the decision point based on the operational cost values of the operation or operations specified by the options. In this example, query execution engine 42 may determine that it is more efficient to use the second index to access the table. That is, even though query parser 40 determined, during query optimization, that candidate access path 44A was most efficient (e.g., based on the placeholder value of 25) of candidate access paths 44, query execution engine 42 may determine, at execution time, that candidate access path 44B is the most efficient of candidate access paths 44 based on the actual value of the variable, 80. Consequently, query execution engine 42 may select node 48, access the table of data source 38A using the second index, and avoid the potentially inefficient use of candidate access path 44A. Query execution engine 42 may retrieve the requested data elements from data source 38A and provide the data to enterprise applications 25. Enterprise applications 25 may use the received data in various ways, such as to generate one or more reports, modify or update other data elements, or perform other operations.

The example operations of FIG. 3 are shown for purposes of illustration only, and, in certain examples, substantially more complex queries may be parsed to generate hybrid access plans in accordance with the techniques described herein. That is, while described in FIG. 3 as determining three candidate access paths and generating a hybrid access path having a single decision point, query parser 40 may, in other examples, be operable to determine any number of candidate access paths and generate a hybrid access path having any number of decision points and corresponding sets of options. In some examples, query parser 40 may be operable to include related decision points in hybrid access paths. A related decision point may be a decision point that shares a set of options with one or more other related decision points. For instance, a hybrid access path may include a first decision point corresponding to a set of two options, Option A and Option B. The hybrid access path may also include a second decision point corresponding to the same set of options. At execution time, query execution engine 42 (or other module) may encounter the first decision point and select an option, such as option A. Based on the selection, query execution engine 42 may remove the selected option from the set of options. Thereafter, when query execution engine 42 encounters the second decision point, there is only one option left (e.g., option B). In this way, decision points of a hybrid access path may also represent different orders of operation between two or more candidate access paths.

Figure 4A:
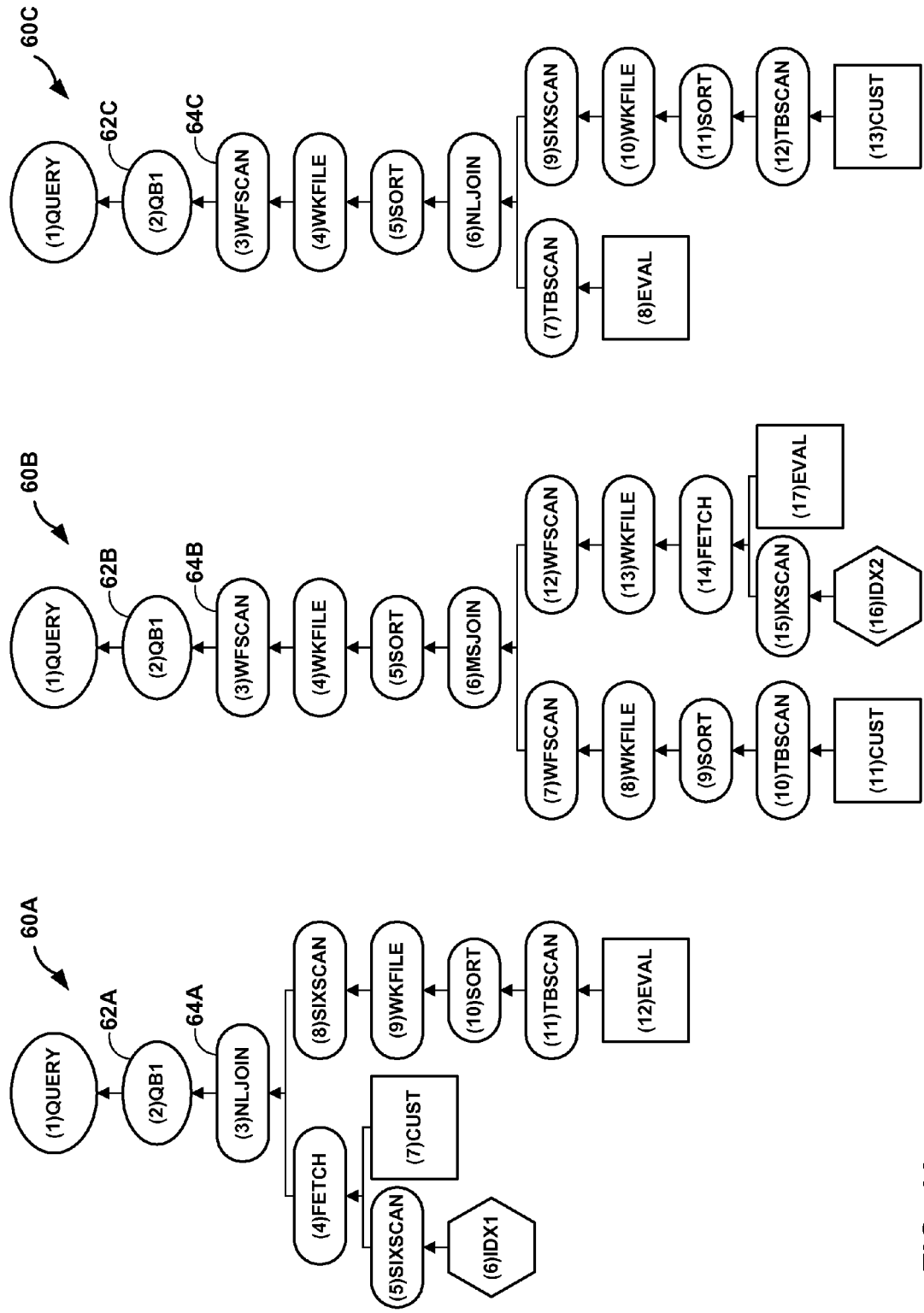
FIGS. 4A and 4B are block diagrams illustrating example access paths, in accordance with one or more techniques of the present disclosure.
Figure 4B:
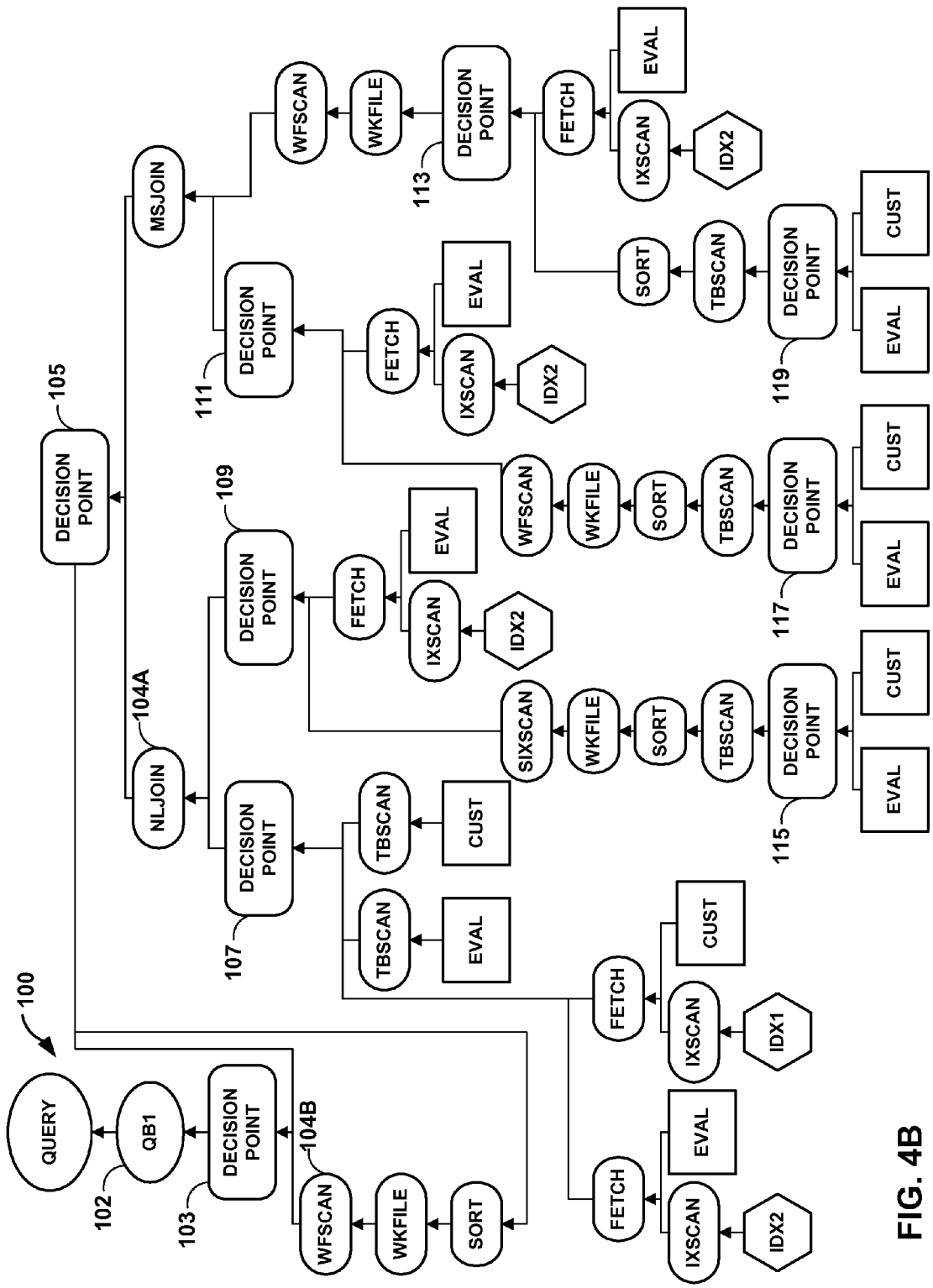

FIGS. 4A and 4B are block diagrams illustrating example candidate access paths 60A-60C (collectively, "candidate access paths 60") and example hybrid access path 100, in accordance with one or more techniques of the present disclosure. The example access paths of FIGS. 4A and 4B are described below within the context of FIGS. 1 and 2. For instance, the access paths of FIGS. 4A and 4B may be generated by data access service 20 of enterprise business intelligence 14. In the example of FIGS. 4A and 4B, candidate access paths 60 and hybrid access path 100 are each displayed as a tree structure. In other examples, access paths may be represented using various other formats, such as lists, arrays, or any other format.

Candidate access paths 60, as shown in the example of FIG. 4A, may be determined by data access service 20 in response to receiving a business query. For instance, data access service 20 may receive the following query to access data from a customer table (CUST) and an evaluation table (EVAL) stored at one or more of data sources 38:

SELECT A.FIRST_NAME||',"||A.LAST_NAME, B.SCORE
FROM CUST A, EVAL B
WHERE A.LAST_NAME LIKE ?
  AND B.DATE >?
  AND A.ID=B.CID
ORDER BY LAST_NAME;

Data access service 20 may determine that there is an index, IDX1, for accessing CUST (LAST _NAME), and also an index, IDX2, for accessing EVAL (CID, DATE). Based on the available indexes and the received business query, data access service 20 may determine candidate access paths for obtaining the requested data. For instance, data access service 20 may determine a plurality of candidate access paths including candidate access paths 60. That is, while only three candidate access paths are shown in the example of FIG. 4A, data access service 20 may, in some examples, determine more candidate access paths that are not shown.

In the example of FIG. 4A, data access service 20 may determine candidate access path 60A. Candidate access path 60A is a tree structure of nodes that represents one possible sequence of operations for obtaining the data requested by the business query. Candidate access path 60A includes a query block node (e.g., node 62A) that represents the root node of a subquery, a nested loop join node (e.g., node 64A) for joining data sets specified in child nodes, and subsequent nodes such as sparse index scan nodes for accessing a sparse index (e.g., specified by a child node). Execution of candidate access path 60A (e.g., by query execution engine 42) may include accessing the CUST table as an outer table, scanning the CUST table using IDX1 with the indexable predicate LAST_NAME LIKE ?, joining the result to the EVAL table as an inner table with a nested loop join and a sparse index, and building the sparse index by performing a table scan of the EVAL table with the stage 1 predicate DATE >?.

Data access service 20 may, in the example of FIG. 4A, determine candidate access path 60B. Candidate access path 60B is a tree structure of nodes representing another possible sequence of operations for obtaining the requested data. Candidate access path 60B includes a query block node (e.g., node 62B) that represents the root node of a subquery, a work file scan node (e.g., node 64B) for scanning a work file (e.g., specified by a child node), and other nodes, such as sort nodes for sorting the rows obtained from previous operations (e.g., specified by child nodes). Execution of candidate access path 60B (e.g., by query execution engine 42) may include accessing the CUST table as an outer table, scanning the CUST table with the stage 1 predicate LAST_NAME LIKE ? then sorting the result set by ID, accessing the EVAL table using IDX2 with the indexable predicate DATE >? to obtain a second result set, joining the result set corresponding to the CUST table to the result set corresponding to the EVAL table as an inner table using the sort merge join operation, and sorting the final result set by LAST_NAME.

In the example of FIG. 4A, data access service 20 may determine candidate access path 60C. Candidate access path 60C is a tree structure representing a third possible sequence of operations for obtaining the requested data. Candidate access path 60C includes a query block node (e.g., node 62C) that represents the root node of a subquery, a work file scan node (e.g., node 64BC) for scanning a work file, and other nodes, such as table space scan nodes for performing a table space scan (e.g., on a table specified by a child node). Execution of candidate access path 60C (e.g., by query execution engine 42) may include accessing the EVAL table as an outer table, scanning the EVAL table using a table space scan with the stage 1 predicate DATE >?, joining the result to the CUST table as an inner table using the nested loop join and a sparse index, and building a sparse index by performing a table space scan of the CUST table with a local predicate LAST_NAME LIKE ?.

Data access service 20 may, in the example of FIGS. 4A and 4B, determine path cost values for the candidate access paths. For instance, data access service 20 may determine a path cost value for each of candidate access paths 60. The path cost values may represent an estimate of the efficiency of the corresponding candidate access path, given expected or estimated parameter values. That is, data access service 20 may not know at optimization time what the parameter values will be for the predicates in the query. This may be because the parameter values will be supplied later (e.g., by a user who runs a report corresponding to the query). Therefore, data access service 20 may, in some examples, provide placeholder values in order to predict path cost values. Using the placeholder values, data access service 20 may determine path cost values for each of candidate access paths 60.

While determined candidate access paths may be associated with an estimated path cost value for determining efficiency, each candidate access path may vary in efficiency depending on how filtering (e.g., restrictive) the actual predicate values are. That is, for a specific candidate access path, the actual path cost value may be very efficient given a specific set of parameter values but, given a different set of parameter values, the path cost value may be substantially worse. The variable performance of the candidate access paths may result from how the access path is structured. For example, the pattern '%' may be provided for the A.LAST_NAME LIKE ? predicate at execution time, which would qualify all of the rows of the CUST table. Conversely, providing the pattern 'Euler' for the A.LAST_NAME LIKE ? predicate at execution time may qualify only a few rows, if any, of the CUST table. Thus, subsequent operations performed on the obtained rows may take minimal execution time (e.g., when only a few rows qualify), substantial execution time (e.g., when many or all rows qualify), or somewhere in between. Similarly, the predicate B.DATE >? may filter anywhere from zero rows to all rows of the EVAL table, depending on the value of the parameter marker at execution time. For instance, providing the pattern of '1900-01-01' may match all rows, while the pattern '2014-01-01' may only match a few rows. For these reasons, selecting a candidate access path based on the estimated path cost value may cause substantial inefficiency in execution if the estimated parameter values are not accurate, as the selected access path may become significantly more costly.

In order to avoid selecting an access path for execution of the business query that may or may not be efficient at execution time, data access service 20 may select a plurality of the candidate access paths and combine the selected paths to generate a hybrid access path. For instance, in the example of FIGS. 4A and 4B, data access service 20 may select candidate access paths 60A, 60B, and 60C (e.g., from a larger set of determined candidate access paths) and generate hybrid access path 100.

As part of generating hybrid access path 100, data access service 20 may traverse each of candidate access paths 60 and determine whether the present node of the specific candidate access path is the same or different than the corresponding node of other candidate access paths. If the nodes are all the same, data access service 20 may copy the node to the hybrid access path. For instance, data access service 20 may traverse candidate access paths 60 and determine whether the node subsequent to the root node is a query block node. That is, data access service 20 may compare nodes 62A, 62B, and 62C. Data access service 20 may determine that the nodes are all the same, and thus copy the node to hybrid access path 100 as node 102.

When traversing each of the candidate access paths, data access service 20 may encounter a node of a candidate access path that is different than the corresponding node of at least one other candidate access path. In such instance, data access service 20 may insert a decision point into the hybrid access path and copy the different nodes to the hybrid access path as child nodes of the decision point. For instance, data access service may determine that node 64A, the nested loop join node of candidate access path 60A, is different than nodes 64B and 64C, the work file scan nodes of candidate access paths 60B and 60C, respectively. Consequently, data access service 20 may create decision point 103 within hybrid access path 100 and copy nodes 64A and 64B/64C below as nodes 104A and 104B. In the example of FIG. 4B, node 104B may not be a direct child node of decision point 103 due to the insertion of another decision node. In other words, in some examples, prior to copying the different nodes to the hybrid access path, data access service 20 may determine whether one or more subsequent decision nodes should be inserted into the hybrid access path. That is, the set of options for a decision point can include a second decision point, with a corresponding second set of options.

In the example of FIGS. 4A and 4B, data access service 20 may continue traversing candidate access paths 60 to generate hybrid access path 100. When differences in the candidate access paths are encountered, data access service 20 may create decision points, such as decision points 105, 107, 109, 111, 113, 115, 117, and/or 119, and corresponding sets of options. By including the decision points in hybrid access path 100, data access service 20 may generate a hybrid access path 100 that can be dynamically switched to be equivalent to any of candidate access paths 60 described above. In some examples, the hybrid access path may be used to execute an access path not included in the selected candidate access paths.

As shown in the example of FIG. 4B, hybrid access path 100 includes a finite set of options or choices for decision points (e.g., respective child nodes of the decision point). Options may correspond to a scan type, a join method, a sort, or other options. For instance, a decision point to choose a scan type could have three options: a table scan, an index scan using index X, or an index scan using index Y. As another example, a decision point could have options to either skip the sort or perform the sort.

In some examples, a hybrid access path may include one or more data structures (e.g., global or one per decision point) that represent the action to be taken at execution time for each decision point. For instance, a data structure could direct an interpreter of the access path to check the value of a particular parameter marker or check the value of the high and low key range of a predicate and pick the best option out of the set of options for that decision point. That is, the data structure or data structures may enable a query execution module to determine what option would be most efficient at runtime based on up-to-date information (e.g., about parameter values for the query).

Decision points 103, 105, 107, 109, 111, 113, 115, 117 and 119, as shown in the example of FIG. 4B, may represent choices to be made at the time of query execution (e.g., by query execution engine 42). Execution of hybrid access path 100 (e.g., by query execution engine 42) may include accessing one of [the EVAL table, the CUST table] as an outer table and scanning one of [the EVAL table, the CUST table] using one of [the table scan operation, an index scan using IDX1, an index scan using IDX2] with one of the predicates [stage 1 DATE >?, stage 1 LAST_NAME LIKE ?, indexable LAST_NAME LIKE ?]. Execution may further include joining the result set to one of [the CUST table, the EVAL table] as an inner table of one of [the nested loop join operation, the sort merge join operation] and other operations as shown in FIG. 4B.

After data access service 20 completes generation of hybrid access path 100, data access service (e.g., query parser 40) may output at least an indication of hybrid access path 100. In the example of FIGS. 4A and 4B, for instance, query parser 40 may output an indication of hybrid access path 100 to query execution engine 42. Query execution engine 42 may execute the query by traversing hybrid access path 100 and deciding on an option at each available decision point (e.g., based on some predetermined heuristics). For instance, if a value of a parameter marker is in a certain range, then query execution engine 42 may select the option to perform the final sort, may pick the EVAL table as the outer table accessed with the IDX2 index, pick the nested loop join operation, and/or access the inner CUST table using a sparse index. That is, at decision point 103, query execution engine 42 may select the WFSCAN node, node 104B. At decision point 105, query execution engine 42 may select the NLJOIN node, node 104A. At decision points 107 and 109, query execution engine 42 may select the FETCH and the SIXSCAN nodes, respectively. Finally, at decision point 115, query execution engine 42 may select the CUST table node.

In some examples, query execution engine 42 may perform the bound operations in line with the selected options for each decision point. That is, query execution engine 42 may perform operations as hybrid access path 100 is traversed. In some examples, query execution engine 42 may select an option for all of the decision points before performing the operations. That is, query execution engine may select the most efficient options for all of the relevant decision points of hybrid access path 100 before performing any of the operations specified by hybrid access path 100.

Figure 5:
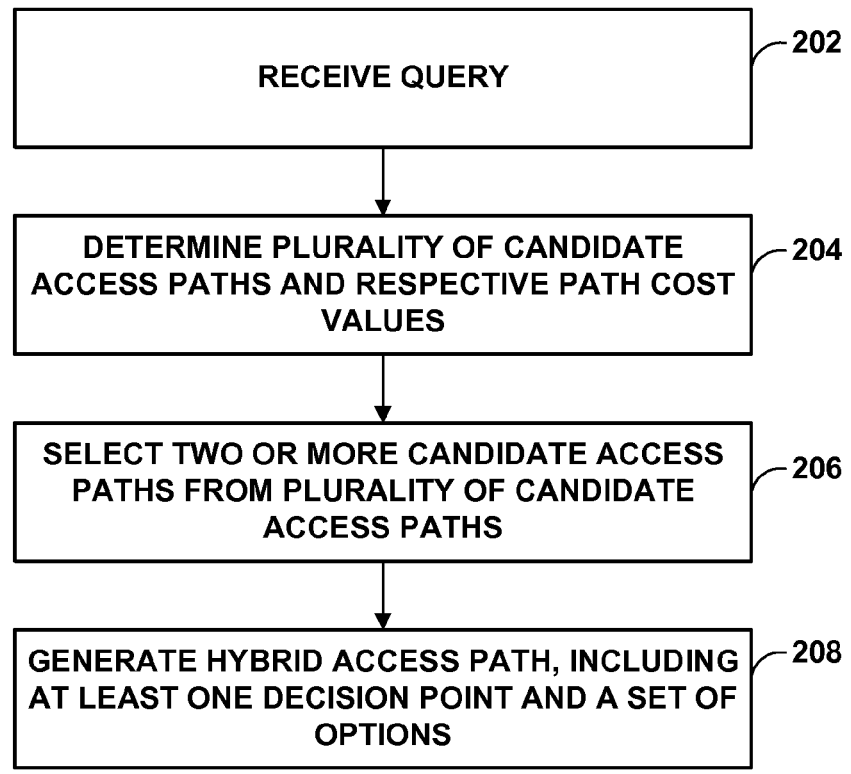
FIG. 5 is a flowchart illustrating example operations of a computing system that may be configured to process queries using hybrid access paths, in accordance with one or more techniques of the present disclosure.

FIG. 5 is a flowchart illustrating example operations of a computing system that may be configured to process queries using hybrid access paths, in accordance with one or more techniques of the present disclosure. For purposes of illustration only, the example of FIG. 5 is described below within the context of FIGS. 1, 2, and 3. For instance, the example operations of FIG. 5 may be performed by query parser 40 of enterprise business intelligence system 14.

In the example of FIG. 5, query parser 40 may receive a business query (202). Based at least in part on the received query, query parser 40 may determine a plurality of candidate access paths and respective path cost values (204). Query parser 40 may select two or more candidate access paths from the plurality of candidate access paths (206). In some examples, query parser 40 may select the two or more candidate access paths based at least in part on the respective path cost values associated with the candidate access paths.

Query parser 40 may, in the example of FIG. 5, generate a hybrid access path that includes at least one decision point and a set of options (208). In some examples, query parser 40 may output at least an indication of the hybrid access path. For instance, query parser 40 may output the indication of the hybrid access path to one or more other components of enterprise business intelligence system 14 (e.g., query execution engine 42) and/or to one or more other computing systems or computing devices.

Figure 6:
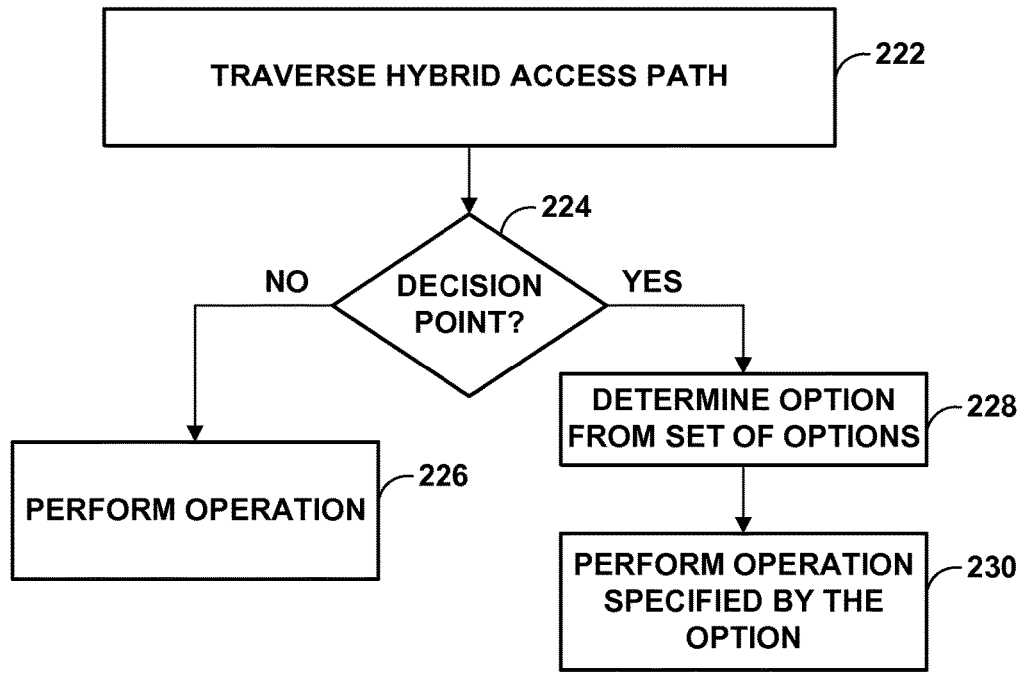
FIG. 6 is a flowchart illustrating example operations of a computing system that may be configured to execute queries using hybrid access paths, in accordance with one or more techniques of the present disclosure.

FIG. 6 is a flowchart illustrating example operations of a computing system that may be configured to execute queries using hybrid access paths, in accordance with one or more techniques of the present disclosure. For purposes of illustration only, the example of FIG. 6 is described below within the context of FIGS. 1, 2, and 3. For instance, the example operations of FIG. 6 may be performed by query execution engine 42 of enterprise business intelligence system 14.

In the example of FIG. 6, query execution engine 42 may traverse the hybrid access path (222). Query execution engine 42 may determine whether the current node of the hybrid access path is a decision point (224). If the current node is not a decision point ("NO" branch of operation 224), query execution module 42 may perform an operation specified by the current node (226). If the current node is a decision point ("YES" branch of operation 224), query execution module 42 may determine an option from a set of options associated with the decision point (228). Query execution module 42 may perform the operation specified by the determined option (230).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Various examples have been described. These and other examples are within the scope of the following claims.

What is claimed is:
1. A system comprising:
  at least one processor; and
  a computer-readable medium having instructions embodied therewith, the instructions executable by the at least one processor to cause the at least one processor to:
    receive a query to access data of one or more databases; and generate, based on the query, a hybrid access path for accessing the data, wherein generating the hybrid access path comprises:
  determining a plurality of candidate access paths to the data and respective path cost values, each of the plurality of candidate access paths comprising a respective candidate sequence of operations;
  selecting, based on the respective path cost values, at least two candidate access paths to the data from the plurality of candidate access paths; and
  condensing the selected candidate access paths into the hybrid access path, where condensing the selected candidate access paths into the hybrid access path includes:
    providing, for each set of operations that has the same operations among the selected candidate access paths, a corresponding single operation in the hybrid access path; and
    providing, for each set of operations that has different operations among the selected candidate access paths, a respective decision point placeholder in the hybrid access path;
where the instructions are executable by the at least one processor to cause the at least one processor to:
  select among the operations of each respective decision point at execution time of the query using information not available until the execution time.

2. The system of claim 1, wherein the hybrid access path comprises a hybrid sequence of operations including the at least one decision point, and wherein the instructions are further executable by the at least one processor to cause the at least one processor to execute the query, wherein executing the query comprises:
  traversing the hybrid sequence of operations;
  responsive to encountering an operation included in the hybrid sequence of operations, performing the operation; and
  responsive to encountering the at least one decision point included in the hybrid sequence of operations, determining an option from a set of options and performing a particular operation specified by the option.

3. The system of claim 2, wherein determining the option from the set of options comprises determining the option based on respective operational cost values associated with options from the set of options.

4. The system of claim 2, wherein each option from the set of options indicates a respective access method to be used for accessing a data source.

5. The system of claim 2, wherein each option from the set of options indicates a respective data source to access.

6. The system of claim 2, wherein each option from the set of options indicates a respective join operation to perform on two data sources.

7. The system of claim 2, wherein the at least one decision point comprises a plurality of related decision points, and wherein a respective set of options for each of the plurality of related decision points is linked such that a selection, for a first decision point from the plurality of related decision points, of a first option from the respective set of options for the first decision point causes the first option to be removed from the respective set of options for each of the plurality of related decision points.

8. The system of claim 1, wherein selecting the two or more candidate access paths comprises selecting candidate access paths, from the plurality of candidate access paths, for which the respective path cost values are each below a threshold path cost value.

9. The system of claim 1, wherein selecting the two or more candidate access paths comprises:
  selecting, from the plurality of candidate access paths, an access path for which the respective path cost value is lowest, wherein the access path for which the respective path cost value is lowest is deemed the best candidate access path; and
  selecting at least one other candidate access path, from the plurality of candidate access paths, such that the respective candidate sequence of operations of the at least one other candidate access path and the respective candidate sequence of operations of the best candidate access path include less than a threshold number of different operations.

10. The system of claim 1, where the selecting among the operations of each respective decision point at execution time of the query using information not available until the execution time selects the operations of only one of the selected candidate access paths of the respective decision point;
  where the instructions are executable by the at least one processor to cause the at least one processor to, for each respective decision point, access the data by only the selected operations of only one of the selected candidate access paths of the respective decision point.

11. A computer program product for processing a query using a hybrid access path, the computer program product comprising a computer readable storage medium having program instructions embodied therewith, the program instructions executable by at least one processor to cause the at least one processor to:
  receive a query to access data of one or more databases; and
  generate, based on the query, a hybrid access path to the data for accessing the data, wherein generating the hybrid access path comprises:
    determining a plurality of candidate access paths and respective path cost values, each of the plurality of candidate access paths comprising a respective candidate sequence of operations;
    selecting, based on the respective path cost values, at least two candidate access paths to the data from the plurality of candidate access paths;
    condensing the selected candidate access paths into the hybrid access path, where condensing the selected candidate access paths into the hybrid access path includes:
      providing, for each set of operations that has the same operations among the selected candidate access paths, a corresponding single operation in the hybrid access path; and
      providing, for each set of operations that has different operations among the selected candidate access paths, a respective decision point placeholder in the hybrid access path;
where the instructions are executable by the at least one processor to cause the at least one processor to:
  select among the operations of each respective decision point at execution time of the query using information not available until the execution time.

12. The computer program product of claim 11, wherein the hybrid access path comprises a hybrid sequence of operations including the at least one decision point, and wherein the program instructions are further executable by the at least one processor to cause the at least one processor to:

execute the query, wherein executing the query comprises:
   traversing the hybrid sequence of operations;
   responsive to encountering an operation included in the hybrid sequence of operations, performing the operation; and
   responsive to encountering the at least one decision point included in the hybrid sequence of operations, determining an option from a set of options and performing a particular operation specified by the option.

13. The computer program product of claim 12, wherein determining the option from the set of options comprises determining the option based on respective operational cost values associated with options from the set of options.

14. The computer program product of claim 12, wherein each option from the set of options indicates a respective access method to be used for accessing a data source.

15. The computer program product of claim 12, wherein each option from the set of options indicates a respective data source to access.

16. The computer program product of claim 12, wherein each option from the set of options indicates a respective join operation to perform on two data sources.

17. The computer program product of claim 12, wherein the at least one decision point comprises a plurality of related decision points, and wherein a respective set of options for each of the plurality of related decision points is linked such that a selection, for a first decision point from the plurality of related decision points, of a first option from the respective set of options for the first decision point causes the first option to be removed from the respective set of options for each of the plurality of related decision points.

18. The computer program product of claim 11, wherein selecting the two or more candidate access paths comprises selecting candidate access paths, from the plurality of candidate access paths, for which the respective path cost values are each below a threshold path cost value.

19. The computer program product of claim 11, wherein selecting the two or more candidate access paths comprises:
   selecting, from the plurality of candidate access paths, an access path for which the respective path cost value is lowest, wherein the access path for which the respective path cost value is lowest is deemed the best candidate access path; and
   selecting at least one other candidate access path, from the plurality of candidate access paths, such that the respective candidate sequence of operations of the at least one other candidate access path and the respective candidate sequence of operations of the best candidate access path include less than a threshold number of different operations.

20. The computer program product of claim 11, where the selecting among the operations of each respective decision point at execution time of the query using information not available until the execution time selects the operations of only one of the selected candidate access paths of the respective decision point;
   where the program instructions are executable by at least one processor to cause the at least one processor to, for each respective decision point, access the data by only the selected operations of only one of the selected candidate access paths of the respective decision point.

* * * * *